United States Patent
Tokunaga et al.

(10) Patent No.: US 8,795,626 B2
(45) Date of Patent: Aug. 5, 2014

(54) ZEOLITE HAVING COPPER AND ALKALI EARTH METAL SUPPORTED THEREON

(75) Inventors: Keisuke Tokunaga, Shunan (JP); Yuuki Ito, Shunan (JP)

(73) Assignee: Tosoh Corporation, Yamaguchi (JP)

(*) Notice: Subject to any disclaimer, the term of this patent is extended or adjusted under 35 U.S.C. 154(b) by 0 days.

(21) Appl. No.: 13/976,242

(22) PCT Filed: Dec. 27, 2011

(86) PCT No.: PCT/JP2011/080283
§ 371 (c)(1),
(2), (4) Date: Jun. 26, 2013

(87) PCT Pub. No.: WO2012/091046
PCT Pub. Date: Jul. 5, 2012

(65) Prior Publication Data
US 2013/0272937 A1    Oct. 17, 2013

(30) Foreign Application Priority Data

Dec. 28, 2010    (JP) .................................. 2010-292585

(51) Int. Cl.
*B01D 53/56*    (2006.01)
*B01D 53/94*    (2006.01)
*B01J 29/00*    (2006.01)
*B01J 29/072*    (2006.01)

(52) U.S. Cl.
USPC ............... 423/700; 423/213.2; 423/213.5; 423/239.2; 502/64; 502/340; 502/345; 60/299; 60/301

(58) Field of Classification Search
USPC ........... 423/700, 213.2, 213.5, 239.2; 502/64, 502/340, 345; 60/299, 301
See application file for complete search history.

(56) References Cited

U.S. PATENT DOCUMENTS

| | | | |
|---|---|---|---|
| 7,842,636 B2 * | 11/2010 | Levey et al. ................... | 502/150 |
| 8,293,199 B2 * | 10/2012 | Beutel et al. ............... | 423/213.2 |
| 2011/0212008 A1 * | 9/2011 | Punke et al. ............... | 423/213.5 |
| 2011/0251048 A1 | 10/2011 | Ariga et al. | |
| 2013/0272937 A1 * | 10/2013 | Tokunaga et al. .......... | 423/213.2 |

FOREIGN PATENT DOCUMENTS

| | | |
|---|---|---|
| JP | 3-131345 A | 6/1991 |
| JP | 2001-525241 A | 12/2001 |
| JP | 2010-519038 A | 6/2010 |
| JP | 2010-168269 A | 8/2010 |
| WO | 99/29400 A1 | 6/1999 |
| WO | 2008/106519 A1 | 9/2008 |

OTHER PUBLICATIONS

International Search Report for PCT/JP2011/080283 dated Mar. 13, 2012.

* cited by examiner

*Primary Examiner* — Timothy Vanoy
(74) *Attorney, Agent, or Firm* — Sughrue Mion, PLLC (57) ABSTRACT

A chabazite-type zeolite having copper and an alkali earth metal supported thereon. The alkali earth metal is preferably at least one metal selected from the group consisting of calcium, magnesium and barium. Moreover, the $SiO_2/Al_2O_3$ molar ratio is preferably from 10 to 50, and the copper/aluminum atomic ratio is preferably from 0.15 to 0.25. This type of chabazite-type zeolite exhibits a higher nitrogen oxide purification rate after a hydrothermal durability treatment than those of conventional chabazite-type zeolite catalysts on which only copper is supported.

10 Claims, 1 Drawing Sheet

ZEOLITE HAVING COPPER AND ALKALI EARTH METAL SUPPORTED THEREON

CROSS REFERENCE TO RELATED APPLICATIONS

This application is a National Stage of International Application No. PCT/JP2011/080283, filed on Dec. 27, 2011, which claims priority from Japanese Patent Application No. 2010-292585, filed on Dec. 28, 2010, the contents of all of which are incorporated herein by reference in their entirety.

TECHNICAL FIELD

The present invention relates to a chabazite-type zeolite having copper and an alkali earth metal supported thereon, and to a method of reducing and removing nitrogen oxides within a vehicle exhaust gas using the chabazite-type zeolite.

Priority is claimed on Japanese Patent Application No. 2010-292585, filed Dec. 28, 2010, the content of which is incorporated herein by reference.

BACKGROUND ART

Among conventional chabazite-type zeolites, catalysts having copper supported thereon in such an amount that the atomic ratio of copper relative to aluminum exceeds approximately 0.25 are already known (see Patent Document 1).

Further, among conventional chabazite-type zeolites, catalysts having an $SiO_2/Al_2O_3$ molar ratio of 15 to 50 and an average particle size of at least 1.5 μm are also known (see Patent Document 2).

DOCUMENTS OF RELATED ART

Patent Documents

Patent Document 1: Published Japanese Translation No. 2010-519038 of PCT
Patent Document 2: Japanese Unexamined Patent Application, First Publication No. 2010-168269

SUMMARY OF THE INVENTION

Problems to be Solved by the Invention

The present invention has an object of providing a novel chabazite-type zeolite which, as a catalyst for reducing and removing nitrogen oxides, exhibits a higher nitrogen oxide purification rate at low temperature than those of conventional chabazite-type zeolite catalysts on which only copper is supported, even after a hydrothermal durability treatment.

Means to Solve the Problems

A summary of the present invention is presented below. In other words:

(1) A chabazite-type zeolite having copper and an alkali earth metal supported thereon.

(2) The chabazite-type zeolite according to (1) above, wherein the alkali earth metal is at least one metal selected from the group consisting of calcium, magnesium and barium.

(3) The chabazite-type zeolite according to (2) above, wherein the alkali earth metal is calcium.

(4) The chabazite-type zeolite according to any one of (1) to (3) above, wherein the atomic ratio of (copper+alkali earth metal)/aluminum is 1.0 or less.

(5) The chabazite-type zeolite according to any one of (1) to (4) above, wherein the atomic ratio of alkali earth metal/copper is at least 0.3 but not more than 2.0.

(6) The chabazite-type zeolite according to any one of (1) to (5) above, wherein the atomic ratio of alkali earth metal/aluminum is at least 0.05.

(7) The chabazite-type zeolite according to any one of (1) to (6) above, wherein the atomic ratio of copper/aluminum is at least 0.15.

(8) The chabazite-type zeolite according to any one of (1) to (7) above, wherein the ion exchange sites are occupied by copper, the alkali earth metal and protons ($H^+$).

(9) A nitrogen oxide reduction catalyst containing the chabazite-type zeolite according to any one of (1) to (8) above.

(10) A method of reducing and removing nitrogen oxides using the nitrogen oxide reduction catalyst according to (9) above.

Effect of the Invention

Even after a hydrothermal durability treatment, the chabazite-type zeolite of the present invention exhibits a high NOx purification rate at temperatures of 200° C. or lower, and even at temperatures of 150° C. or lower, and therefore has high catalytic activity, or a high level of so-called low-temperature activity. Moreover, the chabazite-type zeolite of the present invention exhibits a high NOx purification rate at temperatures of 400° C. or higher, for example, even at temperatures of 500° C. or higher, and therefore also has a high catalytic activity at high temperatures, or so-called high high-temperature activity.

DETAILED DESCRIPTION OF THE INVENTION

The chabazite-type zeolite of the present invention having copper and an alkali earth metal supported thereon is described below.

Chabazite-type zeolites are known as zeolites used in reduction catalysts for nitrogen oxides (hereafter abbreviated as "NOx"), and particularly in NOx reduction catalysts that use ammonia as a reducing agent (generally referred to as SCR catalysts, wherein SCR is an abbreviation for Selective Catalytic Reduction).

The chabazite-type zeolite of the present invention is formed from a chabazite-type zeolite onto which copper and an alkali earth metal have been supported. Accordingly, interactions are generated between the chabazite-type zeolite and the copper and alkali earth metal. As a result, the chabazite-type zeolite of the present invention exhibits excellent catalytic activity when used as an NOx reduction catalyst such as an SCR catalyst. In other words, the chabazite-type zeolite of the present invention can be used as an NOx reduction catalyst having a high NOx purification rate. In particular, the chabazite-type zeolite of the present invention exhibits particularly superior catalytic activity as an NOx reduction catalyst having a high NOx purification rate at comparatively low temperatures of 200° C. or lower, namely an NOx reduction catalyst having a high level of so-called low-temperature activity.

In the present invention, the alkali earth metal is preferably at least one metal selected from the group consisting of calcium (Ca), magnesium (Mg) and barium (Ba), and is more preferably calcium. By using these metals as the alkali earth metal, not only does the catalyst exhibit excellent low-temperature activity, but the catalyst also functions as an NOx reduction catalyst having a high NOx purification rate at temperatures of 500° C. or higher, namely an NOx reduction catalyst having a high level of so-called high-temperature activity.

In the chabazite-type zeolite of the present invention, the atomic ratio of the supported copper and alkali earth metal relative to aluminum ((copper+alkali earth metal)/aluminum) is preferably 1.0 or less, more preferably 0.6 or less, still more preferably 0.5 or less, and still more preferably 0.4 or less. As a result, the chabazite-type zeolite of the present invention not only exhibits low-temperature activity at 200° C. or lower, but also tends to have increased low-temperature activity at temperatures of 150° C. or lower, meaning the low-temperature activity following so-called hydrothermal durability treatment tends to increase particularly significantly. In other words, the chabazite-type zeolite of the present invention can be used as an NOx reduction catalyst that exhibits a high NOx purification rate over a broader temperature range. On the other hand, if the value of (copper+alkali earth metal)/aluminum is too low, then a practical NOx purification rate is not obtained. Accordingly, (copper+alkali earth metal)/aluminum is preferably at least 0.24, and more preferably 0.3 or greater.

In the chabazite-type zeolite of the present invention, the atomic ratio of alkali earth metal/copper is preferably at least 0.3 but not more than 2.0, more preferably at least 0.5 but not more than 1.20, and still more preferably at least 0.55 but not more than 1.1. By ensuring that the ratio between the alkali earth metal and copper satisfies the above range, not only is an NOx reduction catalyst obtained that exhibits a high NOx purification rate at temperatures of 200° C. or lower even after a durability treatment, but the NOx reduction catalyst also tends to exhibit a high NOx purification rate at temperatures of 500° C. or higher. In other words, the chabazite-type zeolite of the present invention is more likely to become an NOx reduction catalyst having high levels of both low-temperature activity and high high-temperature activity.

In the chabazite-type zeolite of the present invention, the atomic ratio of supported copper relative to aluminum (copper/aluminum) is preferably at least 0.15, and more preferably 0.2 or greater. By ensuring that the atomic ratio of supported copper relative to aluminum (copper/aluminum) is at least 0.15, satisfactory NOx purification activity tends to be obtained more easily. On the other hand, in order to achieve superior durability and high-temperature activity, the atomic ratio of supported copper relative to aluminum (copper/aluminum) is typically not more than 0.4, and preferably 0.3 or less.

Further, in the chabazite-type zeolite of the present invention, the atomic ratio of supported alkali earth metal relative to aluminum (alkali earth metal/aluminum) is preferably at least 0.05, and more preferably at least 0.1. Provided that the value of alkali earth metal/aluminum is at least 0.05, the change in the NOx purification rate before and after treatment of the chabazite-type zeolite under high temperature and high humidity tends to be small, namely the durability tends to improve. Moreover, provided that the value of alkali earth metal/aluminum is not more than 0.4, preferably not more than 0.3, and more preferably 0.25 or less, an NOx reduction catalyst that combines catalytic activity and durability can be obtained more easily.

Furthermore, in the chabazite-type zeolite of the present invention, the ion exchange sites are preferably occupied by copper, the alkali earth metal, and protons ($H^+$), and are more preferably occupied by copper and the alkali earth metal. By ensuring that the ion exchange sites are occupied by copper, the alkali earth metal, and protons ($H^+$), the chabazite-type zeolite of the present invention is able to exhibit superior low-temperature activity at temperatures of 150° C. or lower even in a state following treatment under conditions of high temperature and high humidity, namely even in a state following hydrothermal durability treatment.

In the chabazite-type zeolite of the present invention, the $SiO_2/Al_2O_3$ molar ratio is preferably at least 10 but not more than 50, more preferably at least 15 but not more than 50, and more preferably at least 17 but not more than 30. By supporting copper and an alkali earth metal on a chabazite-type zeolite having this type of $SiO_2/Al_2O_3$ molar ratio, a zeolite is formed that can generate an NOx reduction catalyst which not only has a higher low-temperature NOx purification rate than those of conventional chabazite-type zeolites on which only copper is supported, but also has a high NOx purification rate at temperatures of 400° C. or higher.

The chabazite-type zeolite of the present invention has an average particle size that is preferably at least 1.5 μm, more preferably at least 1.7 μm, and still more preferably 2.0 μm or greater. When the average particle size is at least 1.5 μm, the heat resistance tends to increase. The larger the average particle size, the more the heat resistance increases, and provided that the average particle size is not more than 8.0 μm, preferably not more than 5 μm, and still more preferably 3 μm or less, a catalyst can be obtained that has levels of catalytic activity and heat resistance that enable practical use as an NOx reduction catalyst.

In the present invention, the average particle size refers to the size of a primary particle composed of an assembled crystallite, and differs from particles composed of aggregated primary particles (so-called secondary particles).

In the chabazite-type zeolite of the present invention, the weight loss when heating is performed at 900° C. (hereafter referred to as the "weight loss on heating at 900° C.") is preferably not more than 20% by weight, more preferably not more than 18% by weight, and still more preferably 17% by weight or less. The weight loss on heating at 900° C. is an indicator of the stability of the framework of the chabazite-type zeolite substrate. When the weight loss on heating at 900° C. is appropriately small, the framework of the chabazite-type zeolite is more stable. Further, provided that the weight loss on heating at 900° C. is 18% by weight or less, the chabazite-type zeolite of the present invention exhibits satisfactory stability when used as a nitrogen oxide reduction catalyst.

Next is a description of a method of producing the chabazite-type zeolite having copper and an alkali earth metal supported thereon.

There are no particular limitations on the method used for producing the chabazite-type zeolite of the present invention having copper and an alkali earth metal supported thereon. One example of a preferred production method is a method that involves producing a chabazite-type zeolite, converting this zeolite to a proton form ($H^+$ form) or ammonia form ($NH_4^+$ form), supporting copper on the zeolite, and subsequently supporting an alkali earth metal on the zeolite.

The chabazite-type zeolite can be produced from a raw material composition composed of a silica raw material, an alumina raw material, an alkali component, a structure directing agent, and water. Further, a component having a crystallization promoting effect such as seed crystals may also be added to the raw material composition.

As the silica raw material, the use of a colloidal silica, amorphous silica, sodium silicate, tetraethyl orthosilicate, or aluminosilicate gel or the like is preferable.

As the alumina raw material, the use of aluminum sulfate, sodium aluminate, aluminum hydroxide, aluminum chloride, an aluminosilicate gel, or metallic aluminum or the like is preferable. The silica source and the alumina source are preferably in a form that enables thorough uniform mixing with the other components such as the alkali source.

As the alkali component, the use of sodium hydroxide, potassium hydroxide, rubidium hydroxide, cesium hydroxide, an alkali component within an aluminate salt or silicate salt, or an alkali component within an aluminosilicate gel or the like is preferable.

As the structure directing agent, at least one compound selected from the group consisting of hydroxides, halides, carbonates, methyl carbonates and sulfates having an N,N,N-trialkyladamantaneammonium ion as a cation; and hydroxides, halides, carbonates, methyl carbonates and sulfates having an N,N,N-trimethylbenzylammonium ion, an N-alkyl-3-quinuclidylammonia ion or an N,N,N-trialkylexoaminonorbornane ion as a cation is preferable.

Among these, the use of at least one compound selected from among N,N,N-trimethyladamantaneammonium hydroxide, N,N,N-trimethyladamantaneammonium halides, N,N,N-trimethyladamantaneammonium carbonate, N,N,N-trimethyladamantaneammonium methyl carbonate and N,N,N-trimethyladamantaneammonium sulfate as the structure directing agent is particularly preferable.

These raw materials are preferably mixed together to form a raw material composition in which the molar ratio of the structure directing agent/$SiO_2$ is at least 0.05, and the molar ratio of $H_2O/SiO_2$ is at least 5 but less than 30. By ensuring that the molar ratio of the structure directing agent/$SiO_2$ is at least 0.05, crystallization of the chabazite-type zeolite tends to proceed more readily, and by-products (impurities) are less likely to be produced.

When the $H_2O/SiO_2$ molar ratio is less than 30, the yield tends to increase, which is advantageous from an industrial perspective. On the other hand, when the $H_2O/SiO_2$ molar ratio is at least 5, the viscosity of the raw material composition is appropriate for industrial production. Further, in both cases, by-products (impurities and residual unreacted compounds) tend to be less likely.

The raw material composition for the chabazite-type zeolite is preferably produced by mixing these raw materials.

The $SiO_2/Al_2O_3$ molar ratio within the raw material composition is preferably at least 16 but not more than 100. When this molar ratio is at least 16 but not more than 100, a chabazite-type zeolite in which the $SiO_2/Al_2O_3$ molar ratio is at least 15 but not more than 50 can be obtained more easily.

The $OH/SiO_2$ molar ratio within the raw material composition is preferably at least 0.1 but less than 0.9, and is more preferably at least 0.15 but not more than 0.5. The $OH/SiO_2$ molar ratio is an indicator of the amount of hydroxide ions. Accordingly, when the $OH/SiO_2$ molar ratio is at least 0.1, crystallization of the zeolite tends to proceed more readily. Further, when the $OH/SiO_2$ ratio is less than 0.9, dissolution of the silica component is more easily suppressed. As a result, by satisfying these conditions, a chabazite-type zeolite having an $SiO_2/Al_2O_3$ molar ratio and a particle size that satisfy the preferred ranges of the present invention tends to be more readily obtainable.

The chabazite-type zeolite is preferably produced by placing the raw material composition composed of water, the silica raw material, the alumina raw material, the alkali component and the structure directing agent in a sealed pressure vessel, and allowing sufficient time for crystallization to proceed at an arbitrary temperature within a range from 100 to 200° C.

The crystallization of the raw material composition may be performed in a static state. However, crystallization of the raw material composition is preferably performed with the raw material composition undergoing stirring and mixing.

Following completion of the crystallization, the chabazite-type zeolite can be obtained by cooling the mixture adequately, performing a solid-liquid separation, washing the crystals with an adequate amount of pure water, and then performing drying at an arbitrary temperature within a range from 100 to 150° C.

The thus obtained chabazite-type zeolite contains either both or one of the structure directing agent and the alkali metal inside the zeolite pores. Accordingly, these are preferably removed if necessary.

The removal treatment for the alkali metal or the like preferably employs a liquid phase treatment using an acidic solution or a chemical solution containing decomposition components according to the present invention, an exchange treatment using a resin or the like, a thermal decomposition treatment, or an appropriate combination of these treatments.

The chabazite-type zeolite of the present invention is preferably produced by supporting copper and an alkali earth metal on a chabazite-type zeolite obtained in the manner described above.

There are no particular limitations on the supporting method used, provided the copper and the alkali earth metal are supported on the zeolite, and examples of supporting methods that can be employed include an ion exchange method, impregnation support method, evaporation to dryness method, precipitation support method, and physical mixing method.

Prior to supporting copper and the alkali earth metal, the ion exchange capability of the zeolite is preferably used to convert the chabazite-type zeolite to the proton form ($H^+$ form) or ammonia form ($NH_4^+$), with copper and the alkali earth metal then supported on this converted chabazite-type zeolite.

The raw materials used for supporting copper and the alkali earth metal may be copper and the alkali earth metal, or a nitrate, sulfate, acetate, chloride, complex salt, oxide or composite oxide or the like containing both metals. Either soluble or insoluble materials can be used as these raw materials.

In one example of a preferred method of supporting the copper and the alkali earth metal, copper is supported on the chabazite-type zeolite, and the alkali earth metal is then supported. One specific example of this type of supporting method involves supporting copper on the chabazite-type zeolite by an ion exchange method using the copper raw material in a ratio of at least 0.3 equivalents but less than 0.6 equivalents relative to the chabazite-type zeolite, and subsequently supporting the alkali earth metal on the chabazite-type zeolite by an impregnation method using the alkali earth metal raw material in a ratio of at least 0.05 equivalents but less than 0.6 equivalents.

Further, in another preferred method of supporting copper and the alkali earth metal, the copper and the alkali earth metal are supported simultaneously on the chabazite-type zeolite.

In this type of supporting method, a mixed aqueous solution containing a copper compound and an alkali earth metal compound is prepared, and the copper and the alkali earth metal can then be supported simultaneously on the chabazite-type zeolite by mixing the mixed aqueous solution with the chabazite-type zeolite.

Here, the amount of the copper-containing raw material that yields a supported copper abundance ratio equivalent to an atomic ratio of 0.5 relative to the aluminum within the chabazite-type zeolite is deemed to be one equivalent. Further, the amount of the alkali earth metal-containing raw material that yields a supported alkali earth metal abundance ratio equivalent to an atomic ratio of 0.5 relative to the aluminum within the chabazite-type zeolite is deemed to be one equivalent.

The chabazite-type zeolite of the present invention can be used as an NOx reduction catalyst incorporated within an exhaust gas treatment system. Moreover, the chabazite-type zeolite of the present invention can be used as an NOx reduction catalyst that reduces and removes NOx contained within a gas stream in the presence of oxygen, a so-called SCR catalyst.

In particular, the chabazite-type zeolite of the present invention can be used as an NOx reduction catalyst that exhibits high nitrogen oxide reduction efficiency at low temperatures, even following a hydrothermal durability treatment, namely an SCR catalyst with excellent so-called low-temperature activity. Moreover, in addition to this low-temperature activity, the chabazite-type zeolite of the present invention can also be used as an NOx reduction catalyst that exhibits high nitrogen oxide reduction efficiency at high temperatures, namely an SCR catalyst with excellent so-called high-temperature activity.

In the present invention, a hydrothermal durability treatment describes a treatment that is performed for one hour at a temperature of 900° C., under a stream of air containing 10% by volume of water vapor, and using a ratio of gas flow rate/zeolite volume of 100 times/minute.

SCR catalysts are generally evaluated by their performance in a hydrothermal durability treatment. There are no particular prescribed conditions for the hydrothermal durability treatment for SCR catalysts. The hydrothermal durability treatment conditions used in the present invention are within the range of conditions generally used for the hydrothermal durability treatment of SCR catalysts. Accordingly, when compared with generally used treatment conditions, the conditions for the hydrothermal durability treatment of the present invention do not represent particularly special conditions.

A determination as to whether the chabazite-type zeolite of the present invention exhibits low-temperature activity as an SCR catalyst following the hydrothermal durability treatment can be made by performing the hydrothermal durability treatment described above, and then measuring the nitrogen oxide reduction efficiency of the catalyst at a temperature of 200° C. or lower, or at a temperature of 150° C.

Further, a determination as to whether the chabazite-type zeolite of the present invention exhibits high-temperature activity as an SCR catalyst following the hydrothermal durability treatment can be made by performing the hydrothermal durability treatment described above, and then measuring the nitrogen oxide reduction efficiency of the catalyst at a temperature of at least 400° C. but less than 600° C., for example at a temperature of 500° C. or higher.

EXAMPLES

The present invention is described below in further detail using a series of examples. However, the present invention is in no way limited by these examples. Measurements of the various physical properties and characteristics were performed using the methods described below.

(Method of Measuring Average Particle Size)

Measurement of the average particle size was performed using two different methods.

(1) Pure water is added to the chabazite-type zeolite to form a slurry having a solid fraction of 1%. The slurry is subjected to ultrasonic dispersion for 2 minutes, and the particle size determined by performing a particle size distribution measurement using a laser diffraction and scattering method is recorded as the "50% particle size".

(2) Fifty random crystal grains are selected from an SEM photograph acquired at a magnification of 5,000×, and the sizes of the 50 crystal grains are averaged and recorded as the particle size (hereafter referred to as the "SEM size").

(Quantification of Copper, the Alkali Earth Metal, and Aluminum)

The atomic ratios of copper and the alkali earth metal relative to aluminum are determined by ICP compositional analysis.

To perform the measurement, an ICP analysis solution is first prepared by dissolving the measurement sample in a solution prepared from 60% concentrated nitric acid:hydrofluoric acid:pure water=1:1:48. This ICP analysis solution is subjected to ICP measurements, and compositional analysis is performed.

The molar concentration of copper (Cu) obtained by performing ICP compositional analysis is divided by the molar concentration of aluminum (Al) to determine the atomic ratio of copper to aluminum.

The molar concentration of the alkali earth metal obtained by performing ICP compositional analysis is divided by the molar concentration of Al to determine the atomic ratio of the alkali earth metal to aluminum.

(Method of Measuring Nitrogen Oxide Reduction Efficiency)

The nitrogen oxide reduction efficiency when a gas having the conditions shown below is brought into contact with the catalyst at a predetermined temperature was determined by measuring the NOx purification rate. SCR catalysts are generally evaluated using a gas containing a 1:1 mixture of the NOx gas that is to undergo reduction and decomposition and the reducing agent ammonia. The measurement conditions used for measuring the NOx purification rate in the present invention fall within the range of typical conditions used for evaluating the NOx purification properties of SCR catalysts, and do not represent particularly special conditions.

NOx purification conditions (SCR reaction conditions) employed for evaluation in the present invention:

Treatment gas composition:
NO: 200 ppm
$NH_3$: 200 ppm
$O_2$: 10% by volume
$H_2O$: 3% by volume
Remainder: $N_2$ balance
Treatment gas flow rate: 1.5 liter/minute
Treatment gas/catalyst volume ratio: 1,000/minute (Hydration Treatment, and Measurement of Weight Loss on Heating at 900° C. Following Hydration Treatment)

The pre-hydration sample for measurement was placed in a desiccator, the bottom of which was filled with a saturated aqueous solution of ammonium chloride, a vacuum pump was used to reduce the interior pressure to 15 Torr or less, pressure reduction was halted, and the desiccator was left to stand for at least 12 hours in a sealed state, thus obtaining a hydrated measurement sample.

The weight loss on heating at 900° C. was determined by placing the measurement sample that had been subjected to the hydration treatment described above in a crucible, measuring the weight of the sample, subsequently heating the crucible from room temperature to 900° C. over 3 hours in a muffle furnace under a stream of dry air, holding the temperature at 900° C. for 5 hours, thoroughly cooling the sample to room temperature inside a desiccator containing a silica gel, and then measuring the weight of the sample.

In other words, weight loss on heating (% by weight)= (weight of measurement sample prior to heating−weight of measurement sample after heating)/weight of measurement sample prior to heating×100. In order to ensure no change in the amount of water adsorption during standing, thereby enabling a more accurate measurement of the weight loss on heating, the weight loss on heating was measured immediately following the hydration treatment.

Example 1

Production of Chabazite-Type Zeolite

A zeolite for supporting copper was synthesized in accordance with a method disclosed in Example 3 of Japanese Unexamined Patent Application, First Publication No. 2010-168269 (US 2011/0251048 A1). In other words, 19.0 g of a 13% aqueous solution of N,N,N-trimethyladamantane hydroxide, 21.4 g of pure water, 1.7 g of a 48% aqueous solution of potassium hydroxide, and 7.9 g of an amorphous aluminosilicate gel were mixed together to obtain a raw material composition having a composition represented by $SiO_2$: $0.036Al_2O_3:0.10TMADAOH:0.04Na_2O:0.06K_2O:18H_2O$. The thus obtained raw material composition was sealed inside a stainless steel autoclave, and heated at 150° C. for 158 hours. Following heating, the product was subjected to a solid-liquid separation, and the solid was washed with pure water and then dried at 110° C. to complete synthesis of a zeolite.

The thus obtained zeolite was converted to an $NH_4^+$ form zeolite by $NH_4^+$ exchange, and this zeolite was then heated at 500° C. for one hour to obtain an $H^+$ form zeolite. The obtained $H^+$ form zeolite had an $SiO_2/Al_2O_3$ molar ratio of 24.6, a 50% particle size of 6.1 μm, and an SEM size of 2.28 μm.

The X-ray diffraction pattern from an X-ray diffraction diagram of the obtained synthetic product was the same as the X-ray diffraction pattern of Table 2 in Japanese Unexamined Patent Application, First Publication No. 2010-168269. This confirmed that the zeolite was an $H^+$ form chabazite-type zeolite.

(Supporting of Copper and Calcium)

To 200 g of pure water was added 1.1 g of copper acetate monohydrate, and the mixture was stirred at 200 rpm for 10 minutes to prepare a copper acetate aqueous solution.

To the thus obtained copper acetate aqueous solution was added 20.86 g (the weight following drying at 600° C. for one hour, hereafter referred to as "dry base") of the aforementioned synthesized $H^+$ form chabazite-type zeolite having an $SiO_2/Al_2O_3$ molar ratio of 24.6, a 50% particle size of 6.1 μm, and an SEM size of 2.28 μm. The resulting mixture was stirred at 200 rpm at 30° C. for two hours, and a solid-liquid separation was then performed.

The solid phase from the solid-liquid separation was washed with 400 g of warm pure water, and was then dried overnight at 110° C. to complete production of a copper-supporting zeolite.

The results of performing ICP compositional analysis of the obtained copper-supporting zeolite revealed an atomic ratio of copper relative to aluminum (copper/aluminum) of 0.21.

Subsequently, 0.58 g of calcium nitrate tetrahydrate was dissolved in 5.02 g of pure water, and the resulting solution was added dropwise to 15.07 g of the obtained copper-supporting zeolite. Following completion of the dropwise addition, the mixture was mixed for 10 minutes in a mortar, dried overnight at 110° C., and then calcined for one hour at 500° C. in a baking furnace under an air atmosphere to complete production of a zeolite of Example 1.

The results of performing ICP compositional analysis of the obtained zeolite revealed an atomic ratio of copper relative to aluminum (copper/aluminum) of 0.21, and an atomic ratio of calcium relative to aluminum (calcium/aluminum) of 0.25.

(Hydrothermal Durability Treatment)

A dried powder of the obtained zeolite of Example 1 was press-molded, pulverized, and then subjected to particle size regulation to obtain particles of 12- to 20-mesh. Three ml of the size-regulated zeolite was packed in a normal pressure fixed-bed flow reaction tube, and a hydrothermal durability treatment was performed by heating the zeolite at 900° C. for one hour while air having a water content of 10% by volume was passed through the reaction tube at a rate of 300 ml/minute.

(Measurement of Nitrogen Oxide Reduction Efficiency)

Figure 1:
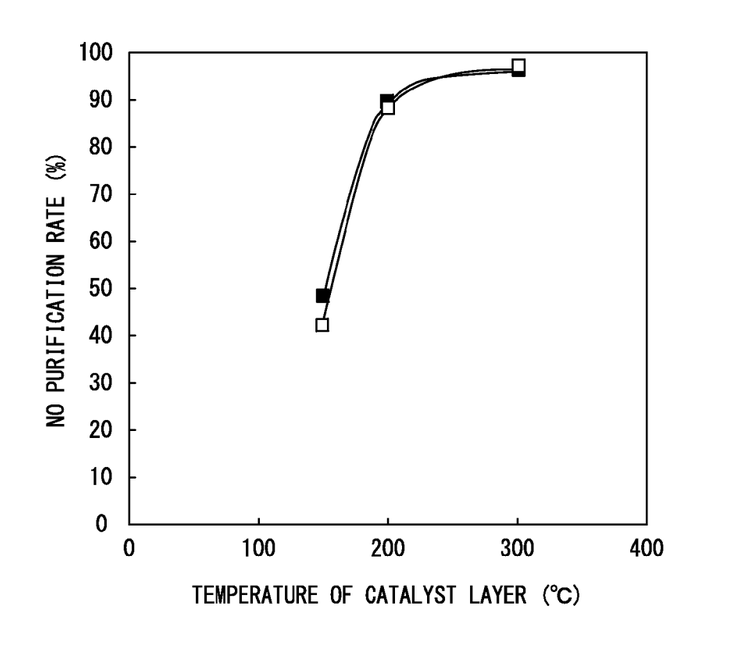
FIG. 1 is a graph of the NOx purification rate for chabazite-type zeolites obtained in Example 1 and Comparative Example 1.

The zeolite that had been subjected to the hydrothermal durability treatment was placed in a steady state reactor, and the nitrogen oxide reduction efficiency was measured by supplying a supply gas mixture containing 200 ppm of NO, 200 ppm of $NH_3$, 10% of $O_2$, 3% of $H_2O$, and the balance of $N_2$. Measurement was performed over a temperature range of 150° C. to 500° C., at a space velocity of 60,000 $hr^{-1}$. The results are shown in Table 2. Further, the relationship between the NOx purification rate and the temperature is shown in FIG. 1.

Example 2

Production of Chabazite-Type Zeolite

A zeolite for supporting copper was synthesized in accordance with the method disclosed in Example 3 of Japanese Unexamined Patent Application, First Publication No. 2010-168269 (US 2011/0251048 A1). In other words, 19.0 g of a 13% aqueous solution of N,N,N-trimethyladamantane hydroxide, 21.4 g of pure water, 1.7 g of a 48% aqueous solution of potassium hydroxide, and 7.9 g of an amorphous aluminosilicate gel were mixed together to obtain a raw material composition having a composition represented by $SiO_2$: $0.036Al_2O_3:0.10TMADAOH:0.04Na_2O:0.06K_2O:18H_2O$. This raw material composition was sealed inside a stainless steel autoclave, and heated at 150° C. for 158 hours. Following heating, the product was subjected to a solid-liquid separation, and the solid was washed with pure water and then dried at 110° C. to complete synthesis of a zeolite. The thus obtained zeolite was heated at 600° C. for two hours, and following removal of the structure directing agent, an $NH_4^+$ exchange was performed to obtain an $NH_4^+$ form zeolite. The thus obtained $NH_4^+$ form zeolite had an $SiO_2/Al_2O_3$ molar ratio of 23.8 and an SEM size of 2.1 μm.

The X-ray diffraction pattern from an X-ray diffraction diagram of the obtained zeolite was the same as the X-ray diffraction pattern of Table 2 in Japanese Unexamined Patent Application, First Publication No. 2010-168269 (US 2011/

0251048 A1). This confirmed that the zeolite was an $NH_4^+$ form chabazite-type zeolite. The X-ray diffraction pattern of the obtained zeolite is shown in Table 1.

TABLE 1

| Lattice spacing d (Å) | Relative intensity |
|---|---|
| 9.19 | 62 |
| 6.27 | 18 |
| 5.45 | 72 |
| 4.96 | 28 |
| 4.25 | 100 |
| 4.00 | 8 |
| 3.91 | 7 |
| 3.55 | 53 |
| 3.39 | 17 |
| 2.89 | 48 |
| 2.85 | 27 |

(Supporting of Copper and Calcium)

In 3 g of pure water were dissolved 0.61 g of copper nitrate tetrahydrate and 0.37 g of calcium nitrate tetrahydrate to prepare a copper nitrate/calcium nitrate mixed aqueous solution.

The copper nitrate/calcium nitrate mixed aqueous solution was added dropwise to 8.0 g (dry base) of the obtained $NH_4^+$ form chabazite-type zeolite, and the mixture was then kneaded for 10 minutes in a mortar.

Subsequently, the zeolite was dried overnight at 110° C., and then calcined for one hour at 500° C. in a baking furnace under an air atmosphere to complete production of a chabazite-type zeolite of Example 2.

The thus obtained chabazite-type zeolite had an atomic ratio of copper relative to aluminum of 0.25, and an atomic ratio of calcium relative to aluminum of 0.14. Further, the weight loss on heating at 900° C. following the hydration treatment was 17.1% by weight.

Next, using the same method as that described for Example 1, the obtained chabazite-type zeolite was press-molded and subjected to particle size regulation, the hydrothermal durability treatment was performed, and the NOx purification rate was then measured. The results are shown in Table 2.

Example 3

With the exception of using a copper nitrate/calcium nitrate mixed aqueous solution prepared by dissolving 0.52 g of copper nitrate tetrahydrate and 0.43 g of calcium nitrate tetrahydrate in 3 g of pure water, a chabazite-type zeolite of Example 3 was prepared in the same manner as that described for Example 2.

The thus obtained chabazite-type zeolite had an atomic ratio of copper relative to aluminum of 0.21, and an atomic ratio of calcium relative to aluminum of 0.16. Further, the weight loss on heating at 900° C. following the hydration treatment was 16.6% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Example 4

With the exception of using a copper nitrate/calcium nitrate mixed aqueous solution prepared by dissolving 0.55 g of copper nitrate tetrahydrate and 0.30 g of calcium nitrate tetrahydrate in 3 g of pure water during the process of supporting the copper and calcium on the zeolite, a chabazite-type zeolite of Example 4 was prepared in the same manner as that described for Example 2.

The thus obtained chabazite-type zeolite had an atomic ratio of copper relative to aluminum of 0.22, and an atomic ratio of calcium relative to aluminum of 0.12. Further, the weight loss on heating at 900° C. following the hydration treatment was 17.6% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Example 5

With the exception of using a copper nitrate/calcium nitrate mixed aqueous solution prepared by dissolving 0.55 g of copper nitrate tetrahydrate and 0.55 g of calcium nitrate tetrahydrate in 3 g of pure water, a chabazite-type zeolite of Example 5 was prepared in the same manner as that described for Example 2.

The thus obtained chabazite-type zeolite had an atomic ratio of copper relative to aluminum of 0.22, and an atomic ratio of calcium relative to aluminum of 0.23. Further, the weight loss on heating at 900° C. following the hydration treatment was 16.2% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Example 6

With the exception of using a copper nitrate/calcium nitrate mixed aqueous solution prepared by dissolving 0.55 g of copper nitrate tetrahydrate and 0.91 g of calcium nitrate tetrahydrate in 3 g of pure water, a chabazite-type zeolite of Example 6 was prepared in the same manner as that described for Example 2.

The thus obtained chabazite-type zeolite had an atomic ratio of copper relative to aluminum of 0.22, and an atomic ratio of calcium relative to aluminum of 0.38. Further, the weight loss on heating at 900° C. following the hydration treatment was 18.4% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Example 7

With the exception of using a copper nitrate/calcium nitrate mixed aqueous solution prepared by dissolving 1.0 g of copper nitrate tetrahydrate and 0.43 g of calcium nitrate tetrahydrate in 3 g of pure water, a chabazite-type zeolite of Example 7 was prepared in the same manner as that described for Example 2.

The thus obtained copper-supporting zeolite had an atomic ratio of copper relative to aluminum of 0.40, and an atomic ratio of calcium relative to aluminum of 0.16. Further, the weight loss on heating at 900° C. following the hydration treatment was 18.8% by weight.

Next, using the same method as that described for Example 1, the chabazite-type zeolite was press-molded and subjected to particle size regulation, the hydrothermal durability treatment was performed, and the NOx purification rate was then measured.

The results are shown in Table 2.

Example 8

Production of Chabazite-Type Zeolite

A zeolite for supporting copper was synthesized in accordance with the method disclosed in Example 1 of Japanese Unexamined Patent Application, First Publication No. 2010-168269 (US 2011/0251048 A1). In other words, 21.3 g of a 13% aqueous solution of N,N,N-trimethyladamantane hydroxide, 17.4 g of pure water, 3.5 g of a 48% aqueous solution of potassium hydroxide, and 7.7 g of an amorphous aluminosilicate gel were mixed together to obtain a raw material composition having a composition represented by $SiO_2$: $0.038Al_2O_3$:$0.11TMADAOH$:$0.04Na_2O$:$0.13K_2O$:$18H_2O$. This raw material composition was sealed inside a stainless steel autoclave, and heated at 150° C. for 158 hours. Following heating, the product was subjected to a solid-liquid separation, and the solid was washed with pure water and then dried at 110° C. to complete synthesis of a zeolite. The thus obtained chabazite-type zeolite was heated at 600° C. for two hours, and following removal of the structure directing agent, an $NH_4^+$ exchange was performed to obtain an $NH_4^+$ form chabazite-type zeolite. The thus obtained $NH_4^+$ form chabazite-type zeolite had an $SiO_2/Al_2O_3$ molar ratio of 17.4 and an SEM size of 1.7 μm.

With the exceptions of using the thus obtained chabazite-type zeolite, and using a copper nitrate/calcium nitrate mixed aqueous solution prepared by dissolving 0.73 g of copper nitrate tetrahydrate and 0.23 g of calcium nitrate tetrahydrate in 3 g of pure water, a chabazite-type zeolite of Example 8 was prepared in the same manner as that described for Example 2.

The thus obtained chabazite-type zeolite had an atomic ratio of copper relative to aluminum of 0.22, and an atomic ratio of calcium relative to aluminum of 0.07. Further, the weight loss on heating at 900° C. following the hydration treatment was 17.7% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Example 9

With the exception of using a copper nitrate/calcium nitrate mixed aqueous solution prepared by dissolving 0.73 g of copper nitrate tetrahydrate and 0.39 g of calcium nitrate tetrahydrate in 3 g of pure water, a chabazite-type zeolite of Example 9 was prepared in the same manner as that described for Example 8.

The thus obtained copper-supporting zeolite had an atomic ratio of copper relative to aluminum of 0.22, and an atomic ratio of calcium relative to aluminum of 0.12. Further, the weight loss on heating at 900° C. following the hydration treatment was 16.9% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Example 10

With the exception of using a copper nitrate/magnesium nitrate mixed aqueous solution prepared by dissolving 0.55 g of copper nitrate tetrahydrate and 0.32 g of magnesium nitrate hexahydrate in 3 g of pure water, a chabazite-type zeolite of Example 10 was prepared in the same manner as that described for Example 2.

The results of ICP compositional analysis of the thus obtained chabazite-type zeolite revealed an atomic ratio of copper relative to aluminum of 0.22, and an atomic ratio of magnesium relative to aluminum of 0.12. Further, the weight loss on heating at 900° C. following the hydration treatment was 17.8% by weight.

Next, using the same method as that described for Example 1, the chabazite-type zeolite was press-molded and subjected to particle size regulation, the hydrothermal durability treatment was performed, and the NOx purification rate was then measured. The results are shown in Table 3.

Example 11

With the exception of using a copper nitrate/barium nitrate mixed aqueous solution prepared by dissolving 0.55 g of copper nitrate tetrahydrate and 0.39 g of barium nitrate in 9 g of pure water, a chabazite-type zeolite of Example 11 was prepared in the same manner as that described for Example 2.

The thus obtained chabazite-type zeolite had an atomic ratio of copper relative to aluminum of 0.22, and an atomic ratio of barium relative to aluminum of 0.12. Further, the weight loss on heating at 900° C. following the hydration treatment was 18.0% by weight.

Next, using the same method as that described for Example 1, the chabazite-type zeolite was press-molded and subjected to particle size regulation, the hydrothermal durability treatment was performed, and the NOx purification rate was then measured. The results are shown in Table 3.

Example 12

With the exception of using a copper nitrate/calcium nitrate mixed aqueous solution prepared by dissolving 0.60 g of copper nitrate tetrahydrate and 0.52 g of calcium nitrate tetrahydrate in 3 g of pure water, a chabazite-type zeolite of Example 12 was prepared in the same manner as that described for Example 8.

The thus obtained copper-supporting zeolite had an atomic ratio of copper relative to aluminum of 0.18, and an atomic ratio of calcium relative to aluminum of 0.16. Further, the weight loss on heating at 900° C. following the hydration treatment was 17.2% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Example 13

With the exception of using a copper nitrate/calcium nitrate mixed aqueous solution prepared by dissolving 0.83 g of copper nitrate tetrahydrate and 0.29 g of calcium nitrate tetrahydrate in 3 g of pure water, a chabazite-type zeolite of Example 13 was prepared in the same manner as that described for Example 8.

The thus obtained copper-supporting zeolite had an atomic ratio of copper relative to aluminum of 0.25, and an atomic ratio of calcium relative to aluminum of 0.09. Further, the weight loss on heating at 900° C. following the hydration treatment was 18.0% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Comparative Example 1

To 200 g of pure water was added 1.1 g of copper acetate monohydrate, and the mixture was stirred at 200 rpm for 10 minutes to prepare a copper acetate aqueous solution. To the copper acetate aqueous solution was added 20.86 g (dry base) of the $H^+$ form chabazite-type zeolite produced in Example 1, the resulting mixture was stirred at 200 rpm at 30° C. for two hours, and a solid-liquid separation was then performed. The solid phase from the solid-liquid separation was washed with 400 g of warm pure water, and was then dried overnight at 110° C. to complete production of a copper-supporting chabazite-type zeolite.

The thus obtained chabazite-type zeolite had an atomic ratio of copper relative to aluminum of 0.21.

Next, using the same method as that described for Example 1, the copper-supporting zeolite was press-molded and subjected to particle size regulation, the hydrothermal durability treatment was performed, and the NOx purification rate was then measured. The results are shown in Table 2.

Comparative Example 2

With the exception of using a copper nitrate aqueous solution prepared by dissolving 0.55 g of copper nitrate tetrahydrate in 3 g of pure water, a chabazite-type zeolite of Comparative Example 2 was prepared using the same method as that described for Example 2.

The thus obtained chabazite-type zeolite had an atomic ratio of copper relative to aluminum of 0.22, and an atomic ratio of calcium relative to aluminum of 0. Further, the weight loss on heating at 900° C. following the hydration treatment was 20.4% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Comparative Example 3

With the exception of using a copper nitrate aqueous solution prepared by dissolving 1.0 g of copper nitrate tetrahydrate in 3 g of pure water, a chabazite-type zeolite of Comparative Example 3 was prepared in the same manner as that described for Example 2.

The thus obtained chabazite-type zeolite had an atomic ratio of copper relative to aluminum of 0.40, and an atomic ratio of calcium relative to aluminum of 0. Further, the weight loss on heating at 900° C. following the hydration treatment was 18.6% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Comparative Example 4

With the exception of using a copper nitrate aqueous solution prepared by dissolving 1.12 g of copper nitrate tetrahydrate in 3 g of pure water, a chabazite-type zeolite of Comparative Example 4 was prepared using the same method as that described for Example 2.

The thus obtained chabazite-type zeolite had an atomic ratio of copper relative to aluminum of 0.45, and an atomic ratio of calcium relative to aluminum of 0. Further, the weight loss on heating at 900° C. following the hydration treatment was 18.8% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Comparative Example 5

With the exception of using a copper nitrate aqueous solution prepared by dissolving 0.73 g of copper nitrate tetrahydrate in 3 g of pure water, a chabazite-type zeolite of Comparative Example 5 was prepared using the same method as that described for Example 8.

The thus obtained chabazite-type zeolite had an atomic ratio of copper relative to aluminum of 0.22, and an atomic ratio of calcium relative to aluminum of 0. Further, the weight loss on heating at 900° C. following the hydration treatment was 20.9% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Comparative Example 6

With the exception of using a copper nitrate aqueous solution prepared by dissolving 1.16 g of copper nitrate tetrahydrate in 3 g of pure water, a chabazite-type zeolite of Comparative Example 6 was prepared using the same method as that described for Example 8.

The thus obtained chabazite-type zeolite had an atomic ratio of copper relative to aluminum of 0.35, and an atomic ratio of calcium relative to aluminum of 0. Further, the weight loss on heating at 900° C. following the hydration treatment was 18.9% by weight.

Next, using the same method as that described for Example 1, the chabazite-type zeolite was press-molded and subjected to particle size regulation, the hydrothermal durability treatment was performed, and the NOx purification rate was then measured. The results are shown in Table 2.

Comparative Example 7

With the exception of using a copper nitrate/zinc nitrate mixed aqueous solution prepared by dissolving 0.55 g of copper nitrate tetrahydrate and 0.49 g of zinc nitrate hexahydrate in 3 g of pure water, a chabazite-type zeolite of Comparative Example 7 was prepared in the same manner as that described for Example 2.

The results of ICP compositional analysis of the thus obtained chabazite-type zeolite revealed an atomic ratio of copper relative to aluminum of 0.22, and an atomic ratio of zinc relative to aluminum of 0.12. Further, the weight loss on heating at 900° C. following the hydration treatment was 18.7% by weight.

Next, using the same method as that described for Example 1, the chabazite-type zeolite was press-molded and subjected to particle size regulation, the hydrothermal durability treatment was performed, and the NOx purification rate was then measured.

TABLE 2

| Example or Comparative Example No. | SEM size | | Cu/Al | Ca/Al | (Cu + Ca)/Al | NOx purification rate before durability treatment | | | NOx purification rate after durability treatment | | | Weight loss on heating at 900° C. |
|---|---|---|---|---|---|---|---|---|---|---|---|---|
| | SiO$_2$/Al$_2$O$_3$ | (μm) | | | | 150° C. | 200° C. | 500° C. | 150° C. | 200° C. | 500° C. | (wt %) |
| Example 1 | 24.6 | 2.3 | 0.21 | 0.25 | 0.46 | — | — | — | 48 | 89 | 78 | — |
| Example 2 | 23.8 | 2.1 | 0.25 | 0.14 | 0.39 | 65 | 86 | 84 | 61 | 86 | 76 | 17.1 |
| Example 3 | 23.8 | 2.1 | 0.21 | 0.16 | 0.37 | 66 | 88 | 84 | 56 | 89 | 80 | 16.6 |
| Example 4 | 23.8 | 2.1 | 0.22 | 0.12 | 0.34 | 65 | 87 | 86 | 58 | 88 | 81 | 17.5 |
| Example 5 | 23.8 | 2.1 | 0.22 | 0.23 | 0.45 | 61 | 85 | 89 | 56 | 86 | 76 | 16.2 |
| Example 6 | 23.8 | 2.1 | 0.22 | 0.38 | 0.60 | 56 | 85 | 82 | 35 | 81 | 67 | 18.4 |
| Example 7 | 23.8 | 2.1 | 0.40 | 0.16 | 0.56 | 68 | 87 | 72 | 34 | 79 | 57 | 18.8 |
| Example 8 | 17.4 | 1.7 | 0.22 | 0.07 | 0.29 | 72 | 89 | 87 | 54 | 87 | 85 | 17.7 |
| Example 9 | 17.4 | 1.7 | 0.22 | 0.12 | 0.34 | 73 | 90 | 83 | 60 | 90 | 79 | 16.9 |
| Example 12 | 17.4 | 1.7 | 0.18 | 0.16 | 0.34 | 69 | 89 | 90 | 56 | 91 | 84 | 17.2 |
| Example 13 | 17.4 | 1.7 | 0.25 | 0.09 | 0.34 | 75 | 90 | 86 | 55 | 88 | 77 | 18.0 |
| Comparative Example 1 | 24.6 | 2.3 | 0.21 | 0 | 0.21 | — | — | — | 42 | 88 | 79 | — |
| Comparative Example 2 | 23.8 | 2.1 | 0.22 | 0 | 0.22 | 68 | 85 | 90 | 43 | 81 | 78 | 20.4 |
| Comparative Example 3 | 23.8 | 2.1 | 0.40 | 0 | 0.40 | 67 | 85 | 80 | 54 | 86 | 64 | 18.6 |
| Comparative Example 4 | 23.8 | 2.1 | 0.45 | 0 | 0.45 | 67 | 85 | 75 | 48 | 84 | 61 | 18.8 |
| Comparative Example 5 | 17.4 | 1.7 | 0.22 | 0 | 0.22 | 72 | 89 | 91 | 44 | 85 | 82 | 20.9 |
| Comparative Example 6 | 17.4 | 1.7 | 0.35 | 0 | 0.35 | 74 | 90 | 80 | 41 | 85 | 68 | 18.9 |

TABLE 3

| Example or Comparative Example No. | SEM size | | Cu/Al | Alkali earth metal/Al | Alkali earth metal + Ca/Al | NOx purification rate before durability treatment | | | NOx purification rate after durability treatment | | | Weight loss on heating at 900° C. |
|---|---|---|---|---|---|---|---|---|---|---|---|---|
| | SiO$_2$/Al$_2$O$_3$ | (μm) | | | | 150° C. | 200° C. | 500° C. | 150° C. | 200° C. | 500° C. | (wt %) |
| Example 10 | 23.8 | 2.1 | 0.22 | 0.12 Mg | 0.34 | 68 | 88 | 88 | 54 | 88 | 81 | 17.8 |
| Example 11 | 23.8 | 2.1 | 0.22 | 0.12 Ba | 0.34 | 70 | 87 | 86 | 46 | 87 | 81 | 18.0 |
| Comparative Example 7 | 23.8 | 2.1 | 0.22 | 0.16 Zn | 0.38 | 61 | 85 | 86 | 26 | 70 | 69 | 18.7 |

From Table 2 it is evident that, compared with Comparative Example 1, Example 1 exhibits an NOx purification rate following the hydrothermal durability treatment that is particularly high under low-temperature conditions at 150° C., indicating a high level of low-temperature activity. From Table 3 it is evident that unlike the metals of group 2 that represent typical elements, a metal of group 12 that represents a transition element is unable to achieve the object of the present invention.

INDUSTRIAL APPLICABILITY

The chabazite-type zeolite of the present invention can be used as a catalyst incorporated within an exhaust gas treatment system. Moreover, the chabazite-type zeolite of the present invention can be used as an NOx reduction catalyst, and particularly as an SCR catalyst, which reduces and removes nitrogen oxides contained within a vehicle exhaust gas in the presence of a reducing agent.

DESCRIPTION OF THE REFERENCE SIGNS

Black square: Example 1
White square: Comparative Example 1

The invention claimed is:

1. A chabazite-type zeolite having copper and an alkali earth metal supported thereon.
2. The chabazite-type zeolite according to claim 1, wherein the alkali earth metal is at least one metal selected from the group consisting of calcium, magnesium and barium.
3. The chabazite-type zeolite according to claim 2, wherein the alkali earth metal is calcium.
4. The chabazite-type zeolite according to claim 1, wherein an atomic ratio of (copper+alkali earth metal)/aluminum is 1.0 or less.
5. The chabazite-type zeolite according to claim 1, wherein an atomic ratio of alkali earth metal/copper is at least 0.3 but not more than 2.0.
6. The chabazite-type zeolite according to claim 1, wherein an atomic ratio of alkali earth metal/aluminum is at least 0.05.
7. The chabazite-type zeolite according to claim 1, wherein an atomic ratio of copper/aluminum is at least 0.15.
8. The chabazite-type zeolite according to claim 1, wherein ion exchange sites are occupied by copper, the alkali earth metal and protons (H$^+$).
9. A nitrogen oxide reduction catalyst, comprising the chabazite-type zeolite according to claim 1.
10. A method of reducing and removing nitrogen oxides using the nitrogen oxide reduction catalyst according to claim 9.

* * * * *